8003X
No Printed Specification Availa
J. Riley,
Nozzle,
Patented Feb. 6, 1834.
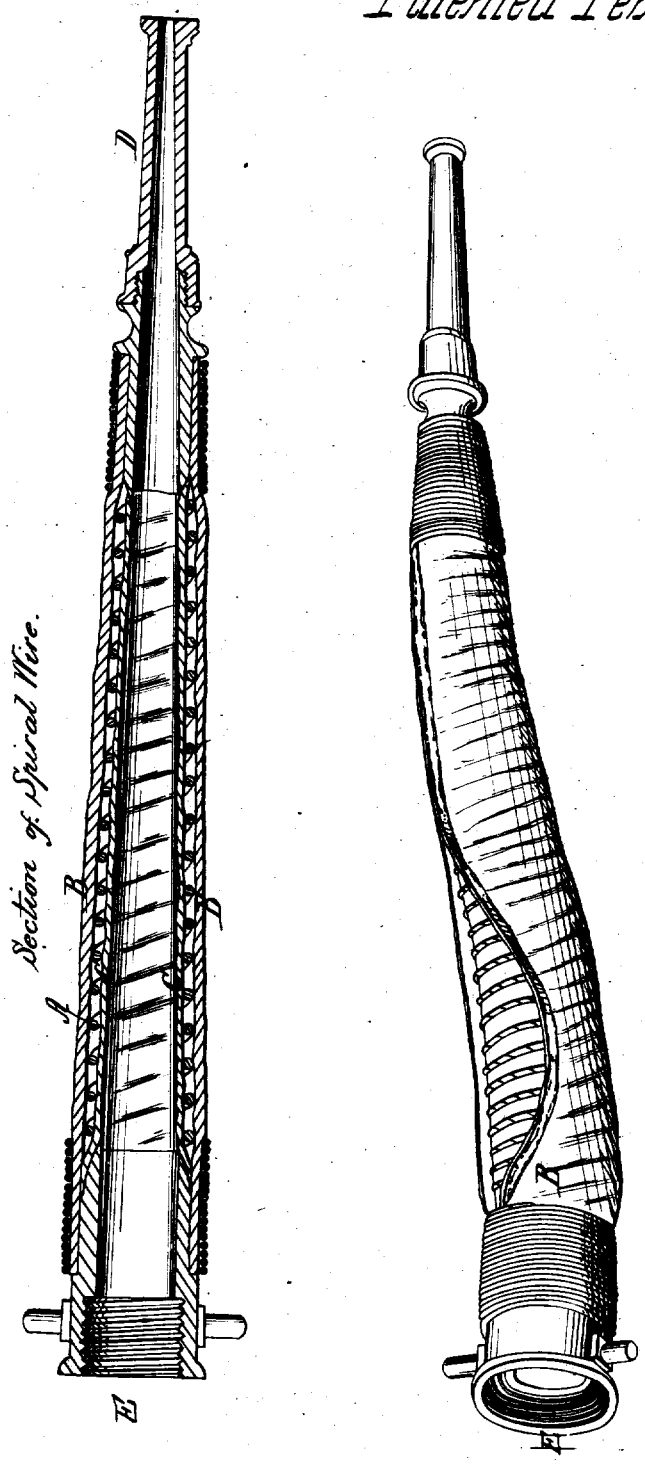
N. PETERS, PHOTO-LITHOGRAPHER, WASHINGTON, D. C.

8003X Jul. 6. 1834 [illegible]

James Riley, Boston Massachusetts

Letters Patent.

The Schedule referred to in these Letters Patent and making part of the same, containing a description in the words of the said James Riley himself of his improvement in the manufacture of pipes for Fire Engines.

To all to whom these presents shall come. Be it known that I, James Riley of Boston, in the County of Suffolk and Commonwealth of Massachusetts, Saddle and harness maker, have invented a new and useful improvement in the manufacture of pipes for fire Engines and other apparatus, and that the following is a full and exact description of the construction and operation of the said Machine, as invented and improved by me.

All pipes for fire engines have heretofore been made of copper, brass or some other Metallic substance, covered with leather or cord; and from their nature and construction are "inelastic." The improved pipe which I have invented, and for which I hereby claim a patent, is made in the following manner, viz, upon a conical pole about the proposed length and size of a pipe required, is placed at the smaller end a male screw intended to fit the female screw on the mouth piece as is hereinafter mentioned; and at the other or larger end of a female screw of the desired size; the shank of each screw turning inwards in the pole, and towards each other, over these shanks and pole is sewed a coveri g of leather; and over this covering is drawn the tinned wire previously prepared in the following way viz; on and round a pole of the same make and size, as the one hereinbefore described is to be wound tin wire in dimension about number nine or ten spirally and very tightly so that the wire when wound around the whole length thereof formed may be like the threads of a screw, about three eighths of an inch apart; after this preparation the tinned wire is taken off and [illegible]

[illegible]

8003X is the construction and use of the peculiar kind of pipe, and the several parts thereof in combination for the purposes aforesaid.

In testimony that the above is a true specification of my said invention and improvement, I have hereto set my hand this third day of december in the year of our Lord one thousand eight hundred and thirty three.

Exd. W.H.

Witnesses
William Minot.
Patrick Riley.

James Riley

Drawing

871 Words (Patented February 6. 1834)